(12) United States Patent
Rohee

(10) Patent No.: US 6,845,956 B2
(45) Date of Patent: Jan. 25, 2005

(54) TRACK ASSEMBLY FOR A MOTOR VEHICLE SEAT, AND A SEAT EQUIPPED WITH SUCH A TRACK ASSEMBLY

(75) Inventor: René Rohee, La Chapelle Biche (FR)

(73) Assignee: Faurecia Sieges d'automobile S.A., Paris (FR)

(*) Notice: Subject to any disclaimer, the term of this patent is extended or adjusted under 35 U.S.C. 154(b) by 0 days.

(21) Appl. No.: 10/776,765

(22) Filed: Feb. 11, 2004

(65) Prior Publication Data

US 2004/0178316 A1 Sep. 16, 2004

(30) Foreign Application Priority Data

Feb. 13, 2003 (FR) ................................ 03 01731

(51) Int. Cl.[7] ............................................. F16M 13/00
(52) U.S. Cl. ..................................... 248/430; 297/341
(58) Field of Search ............................. 248/424, 430, 248/429; 297/341, 344.1; 296/65.13

(56) References Cited

U.S. PATENT DOCUMENTS

| | | | |
|---|---|---|---|
| 1,726,597 A | 9/1929 | Templeton | |
| 4,534,532 A | 8/1985 | Parizet | |
| 4,842,232 A | * 6/1989 | Pipon et al. | ................. 248/395 |

FOREIGN PATENT DOCUMENTS

| | | |
|---|---|---|
| FR | 2 493 242 | 5/1982 |
| FR | 2 767 096 | 2/1999 |
| GB | 457495 | 11/1936 |

OTHER PUBLICATIONS

French International Search Report, FR 0301731; Report dated Oct. 14, 2003.

* cited by examiner

*Primary Examiner*—Ramon O Ramirez
(74) *Attorney, Agent, or Firm*—Marshall, Gerstein & Borun LLP

(57) ABSTRACT

A track assembly for a motor vehicle seat, the track assembly comprising a male track and a female track. An internal space extends longitudinally between the male track and the female track. The cross-section of the internal space varies along the longitudinal axis of the track assembly. A seat equipped with such a track assembly.

10 Claims, 3 Drawing Sheets

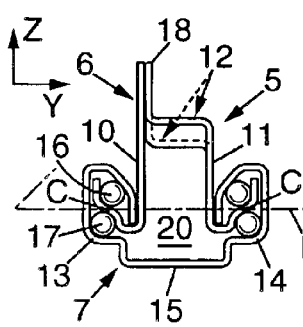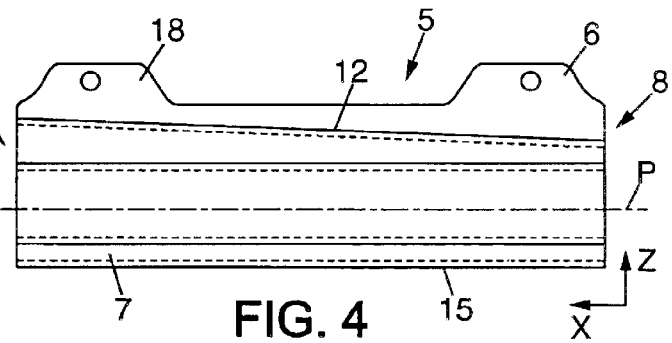
FIG. 3 FIG. 4
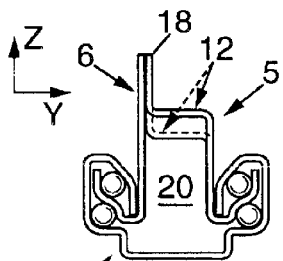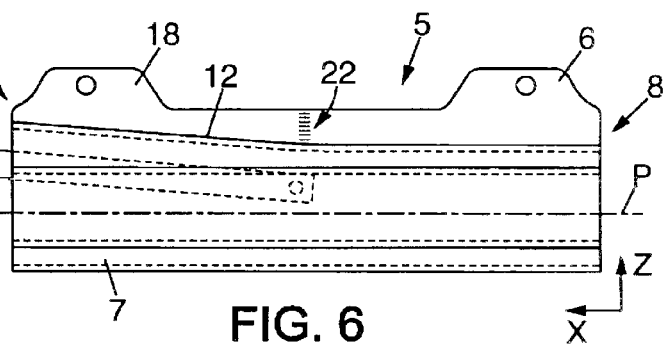
FIG. 5 FIG. 6
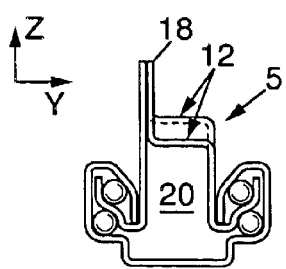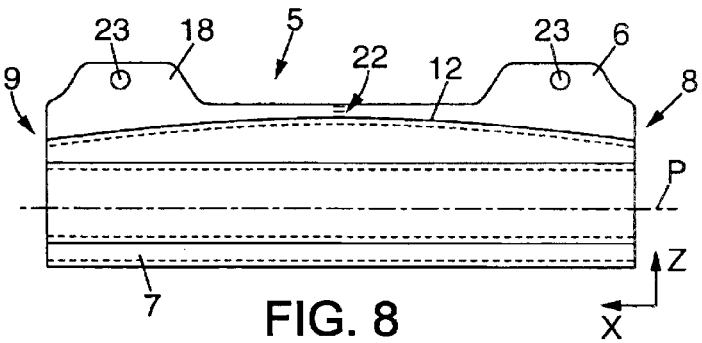
FIG. 7 FIG. 8

ND A SEAT EQUIPPED
TRACK ASSEMBLY FOR A MOTOR VEHICLE SEAT, AND A SEAT EQUIPPED WITH SUCH A TRACK ASSEMBLY

The present invention relates to track assemblies for a motor vehicle seat, and to seats equipped with such track assemblies.

More particularly, the invention relates to a track assembly for a motor vehicle seat, the track assembly comprising a male track and a female track extending between a rear end and a front end along a longitudinal axis and sliding relative to each other along the longitudinal axis, over a rectilinear path in a slide plane, the male track and the female track each being generally "U-shaped" as a channel-section, this channel section being formed of:

two vertical flanges; and a web interconnecting the two vertical flanges, the male track and the female track thus defining an internal space extending longitudinally between the flanges of the male track and the two webs.

BACKGROUND OF THE INVENTION

Document FR-A-2 767 096 describes an example of such a track assembly in which each flange of the male track is inserted, at a flange of the female track, between two ball raceways defining a slide path. The track assemblies described in that document are further provided with a U-shaped control bar. Each branch of that U-shape penetrates into the internal space in which it co-operates with a locking mechanism for locking the tracks to prevent them from sliding relative to each other. In order to unlock or to lock the track s so as to prevent them from sliding relative to each other or so as to enable them to slide relative to each other, a user moves the control bar respectively upwards or downwards, via the portion that forms the web of the U-shape.

It can be understand that, in that type of track assembly, which is otherwise entirely satisfactory, the internal space must be sufficient to enable each branch of the control bar to move in a vertical plane to an extent necessary for locking and unlocking the tracks.

In other cases, the internal space must be sufficient to receive the heads of bolts and/or of nuts.

However, developing an internal space that is larger can, in some cases, be achieved to the detriment of the rigidity of the tracks along a horizontal axis perpendicular to the longitudinal axis of the track assemblies.

SUMMARY OF THE INVENTION

According to one aspect, the present invention provides track assemblies that have larger internal spaces, e.g. for installing accessories (such as a control bar) on the track assembly, while still having sufficient rigidity in particular perpendicularly to the longitudinal axis of the track assemblies, in a plane parallel to the slide plane.

To this end, the invention provides a track assembly having the above-mentioned characteristics and in which the cross-section of the internal space, perpendicular to the longitudinal axis, varies along said longitudinal axis.

By means of these provisions, it is possible to increase the size of the internal space, at least locally, which results in the cross-section being increased while retaining male and female track webs that are sufficiently close to the respective ones of the slide paths to have the desired rigidity perpendicularly to the longitudinal axis of the track assemblies, in a plane parallel to the slide plane.

In preferred embodiments of the invention, it is optionally possible also to use one or more of the following provisions:

one of the tracks, namely either the male track or the female track, is adapted to be fixed to a vehicle seat and the web of said track extends away from the slide plane so as to increase the cross-section of the internal space going towards the front end;

the track that is adapted to be fixed to a vehicle seat extends progressively away from the slide plane, starting from a central zone substantially half-way between the front end and the rear end, going towards the front end, in order to increase the cross-section of the internal space going towards the front end;

an anchor plate for fixing a vehicle seat to the track that is adapted to be fixed to a vehicle seat extends substantially from the web of said track away from the slide plane, said anchor plate having a stressed zone that is stressed by a forming operation, and that is situated substantially in the central zone;

the web of the track adapted to be fixed to a vehicle seat extends away from the slide plane so as to increase the cross-section of the internal space going towards the front end and going towards the rear end, while the cross-section of the internal space is at a minimum in a central zone situated substantially half-way between the front end and the rear end;

one of the tracks, namely either the male track or the female track is adapted to be fixed to a vehicle seat, and, in a central zone situated substantially half-way between the front end and the rear end, the web of said track extends away from the slide plane so as to increase the cross-section of the internal space in said central zone, the web of the male track being closer to the slide plane in the vicinities of the front and rear ends;

one of the tracks, namely either the male track or the female track is adapted to be fixed to a vehicle floor, and the web of said track extends away from the slide plane so as to increase the cross-section of the internal space going towards at least one of the ends, namely the front end and/or the rear end;

one of the track s, namely either the male track or the female track is adapted to be fixed to the vehicle floor and the web of said track extends away from the slide plane so as to increase the cross-section of the internal space in a central zone situated substantially half-way between the front end and the rear end; and the male track is adapted to be fixed to the seat, and the female track is adapted to be fixed to the floor of a vehicle.

In another aspect, the invention provides a motor vehicle seat in which a track assembly as mentioned above is fixed via the male track or via the female track.

BRIEF DESCRIPTION OF THE DRAWINGS

Other aspects, objects, and advantages of the invention will appear on reading the following description of embodiments thereof.

The invention will also be understood more clearly from the drawings, in which:

FIG. 3 is a diagrammatic section view of a track assembly such as one of the track assembly s shown in FIG. 1;

FIG. 4 is a diagrammatic side elevation view of the track assembly of FIG. 3;

FIG. 5 is a diagrammatic view analogous to the view of FIG. 3, showing another embodiment of a track assembly of the present invention;

FIG. 6 is a diagrammatic side elevation view of the track assembly of FIG. 5;

FIG. 7 is a diagrammatic view analogous to the view of FIGS. 3 and 5, showing another embodiment of a track assembly of the present invention;

FIG. 8 is a diagrammatic side elevation view of the track assembly of FIG. 7;

MORE DETAILED DESCRIPTION

In the various figures, like references designate elements that are identical or similar.

Figure 1:
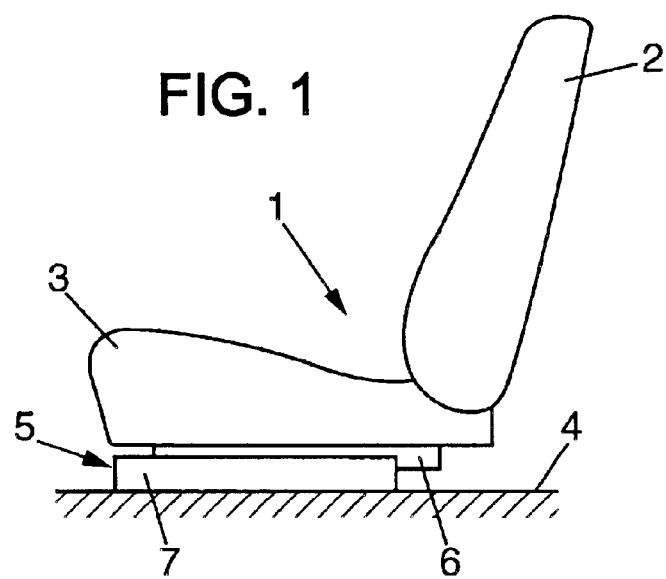
FIG. 1 is a diagrammatic side view of an embodiment of a seat of the present invention.

A first embodiment of the seat 1 of the invention is shown in FIG. 1.

In this embodiment, the seat 1 is, for example, a front seat of a motor vehicle. Said seat comprises a seat back 2 and a seat proper 3. The seat proper 3 is mounted to slide on a floor 4 via a pair of track assembly s 5.

Each track assembly 5 is made up of a male track 6 and of a female track 7.

Figure 2:
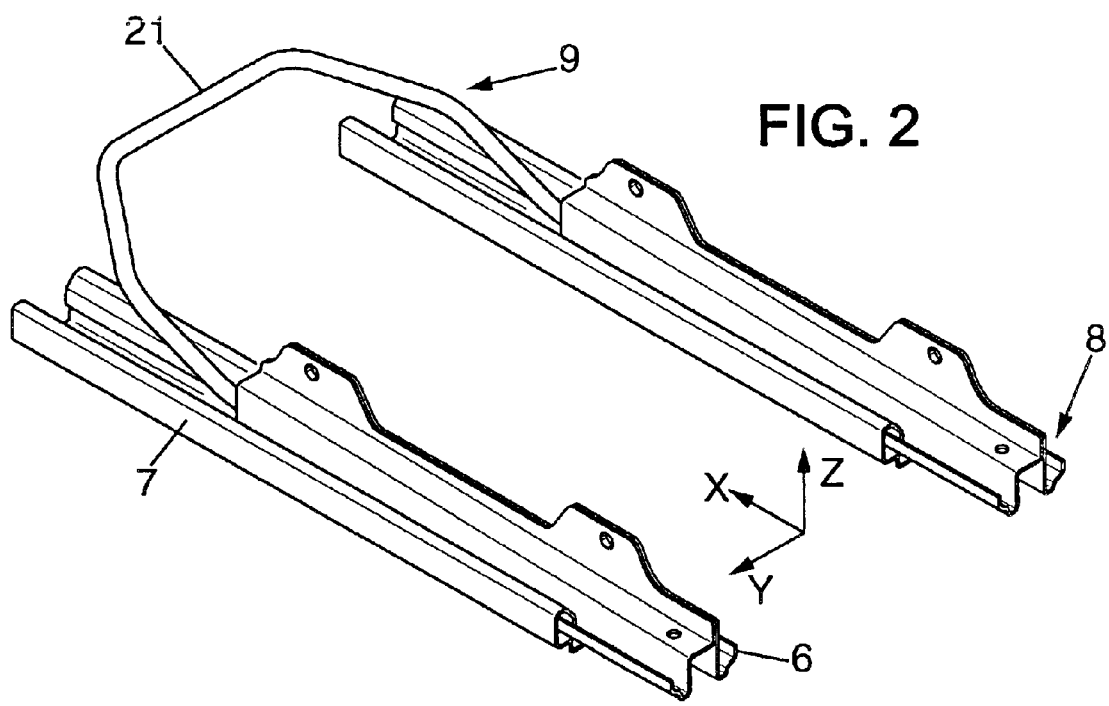
FIG. 2 is a diagrammatic perspective view of an example of a pair of track assembly s for equipping a seat such as the seat shown in FIG. 1.

As shown in FIG. 2, the male track 6 and the female track 7 extend along a longitudinal axis X between a rear end 8 and a front end 9. The male track 6 and the female track 7 slide relative to each other along the longitudinal axis X. The male track 6 and the female track 7 are locked and unlocked by a control bar 21 so that they are respectively prevented from sliding relative to each other and enabled to slide relative to each other along the longitudinal axis X.

In the embodiment described herein, the male track 6 is adapted to be fixed to the seat proper 3 and the female track 7 is adapted to be fixed to the floor 4.

The male track 6 and the female track 7 are generally U-shaped as a channel-section.

As shown in FIG. 3, the male track 6 comprises two vertical side flanges 10, 11 and a web 12 and the female track 7 comprises two side flanges 13, 14 and a web 15.

Each flange 10, 11 of the male track slides between two rows of balls 16, 17 which are themselves received in a flange 13 or 14 of the female track 7. This type of arrangement is well known to the person skilled in the art, and is described, for example, in Document FR-A-2 767 096.

A slide path C is defined as a straight line segment extending along the longitudinal axis X, substantially between two rows of balls 16, 17. A slide plane P is defined as containing the two slide paths C, i.e. between the two rows of balls 16, 17 firstly at the flanges 10 and 13, and secondly at the flanges 11 and 14.

The flanges 10, 11 of the male track 6 are constituted by folded portions of the longitudinal edges of respective ones of two metal sheets which are connected together (e.g. by crimping) in a plane perpendicular to the slide plane P, in order to form an anchor plate 18 adapted to be fixed to the seat proper 3. One of said metal sheets has a zone folded back into a plane substantially parallel to the slide plane P, said zone forming the web 12. Each of the two flanges 10, 11 of the male track 6 is adapted to be held, along a slide path C, so that it moves in guided manner, by a corresponding flange 13, 14 of the female track 7.

The flanges 13, 14 of the female track 7 are constituted by folded portions of respective ones of the two longitudinal edges of a single metal sheet, the web 15 corresponding to a zone that extends substantially parallel to the slide plane P between said folded portions.

The inter-engaged folded portions of the flanges 10 & 13 and of the flanges 11 & 14 form walls that are spaced apart from each other in the slide plane P by a constant distance along a first axis Y perpendicular to the longitudinal axis X. The web 12 of the male track 6 is spaced apart from the web 15 of the female track 7 along a second axis Z perpendicular to the longitudinal axis X. The walls formed by the inter-engaged folded portions of the flanges 10, 11, 13, and 14 co-operate with the webs 12, 15 to define an internal space 20.

As shown in FIG. 4, the web 12 of the male track 6 extends away from the slide plane P with a constant slope from the rear end 8 to the front end 9. The web 15 of the female track 7 remains parallel to the slide plane P. The cross-section of the internal space 20, perpendicular to the longitudinal axis X, thus increases going towards the front end 9, by means of an increase in its height, e.g. by about 5 millimeters (mm), along the second axis Z (see, in FIG. 3, the difference in height between the dashed line representing the web 12 in the vicinity of the rear end 8, and the uninterrupted line representing the web 12 in the vicinity of the front end 9). This makes it possible to have clearance sufficient to actuate the control bar 21 (see FIG. 2). However, in the vicinity of the rear end 8, the web 12 of the male track is close to the slide plane so as to guarantee that good strength is imparted to the track assembly 5, in particular in the event of side impacts, i.e. impacts along the first axis Y.

In a second embodiment, shown in FIGS. 5 and 6, the track assembly 5 differs from the above-described embodiment essentially by the fact that the slope of the web 12 of the male track 6 relative to the slide plane P is not constant between the rear end 8 and the front end 9. The respective webs 12, 15 of the male track 6 and of the female track 7 remain substantially parallel between the rear end 8 and half-way along the male track 6, and then the web of the male track slopes away from the web of the female track going towards the front end 9 (see FIG. 5 which shows, as a dashed line, the web 12 over the half situated closer to the rear end 8, and, as an uninterrupted line, the web 12 in the vicinity of the front end 9). Since the control bar 21 is hinged in the vicinities of the ends of the branches of its U-shape about an axis parallel to the second direction Y and situated substantially in the middle of the male track 6, it suffices to provide clearance-forming space over the half of the male track 6 that is situated in the vicinity of the front end 9. Thus, maximum rigidity is retained over that half of the male track 6 which is situated in the vicinity of the rear end 8. In addition, in the central zone, corresponding to where the slope in the web 12 of the male track changes, a stressed zone 22 on the anchor plate 18 is obtained by a forming operation, which zone acts as a stiffener (see FIG. 6).

In a third embodiment, shown in FIGS. 7 and 8, the track assembly 5 differs from the above-described track assembly s essentially by the fact that the web 12 of the male track 6 is closer to the slide plane P at the rear end 8 and at the front end 9, while said web 12 extends away from the slide plane P in a central zone situated substantially half-way between the front end 9 and the rear end 8. The cross-section of the internal space 20 thus increases in said central zone (FIG. 7 shows, as an uninterrupted line, the web 12 at the rear end 8 and at the front end 9, and, as a dashed line, the web 12 in the vicinity of the central zone). This shape makes it possible to impart bracing-type reinforcement to the male track 6, strengthening its resistance to traction forces exerted along the second axis Z, at the anchor points 23 at which the seat proper 3 is anchored to the fixing plate 18. In addition, in the central zone of the anchor plate 18, a stressed zone 22 is obtained by a forming operation, which zone acts as a stiffener (see FIG. 8).

Figure 9:
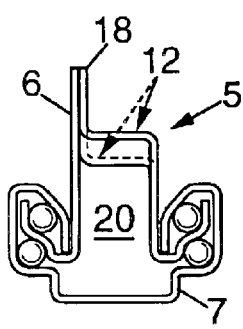
FIG. 9 is a diagrammatic view analogous to the view of FIGS. 3, 5, and 7, showing another embodiment of a track assembly of the present invention.
Figure 10:
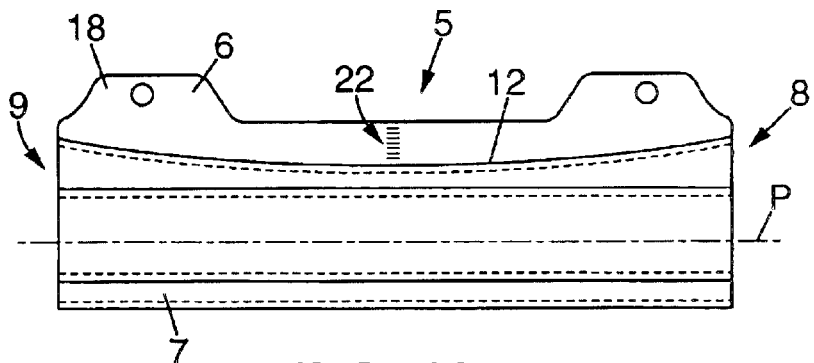
FIG. 10 is a diagrammatic side elevation view of the track assembly of FIG. 9.

In a fourth embodiment shown in FIGS. 9 and 10, the track assembly 5 differs from the above-described track assembly essentially by the fact that the web 12 of the male track 6 is further away from the slide plane P at its rear end 8 and at its front end 9, while said web 12 comes closer to the slide plane P in a central zone situated substantially half-way between the front end 9 and the rear end 8. The cross-section of the internal space 20 thus decreases in said central zone (FIG. 9 shows, as an uninterrupted line, the web 12 at the rear end 8 and at the front end 9, and, as a dashed line, the web 12 in the vicinity of the central zone). This shape, which is symmetrical to the shape of the preceding embodiment, makes it possible to obtain a stressed zone 22 by a forming operation, which zone acts as a stiffener (see FIG. 10).

Figure 11:
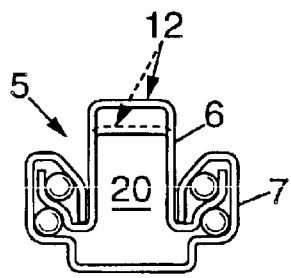
FIG. 11 is a diagrammatic view analogous to the view of FIGS. 3, 5, 7, and 9, showing another embodiment of a track assembly of the present invention.
Figure 12:
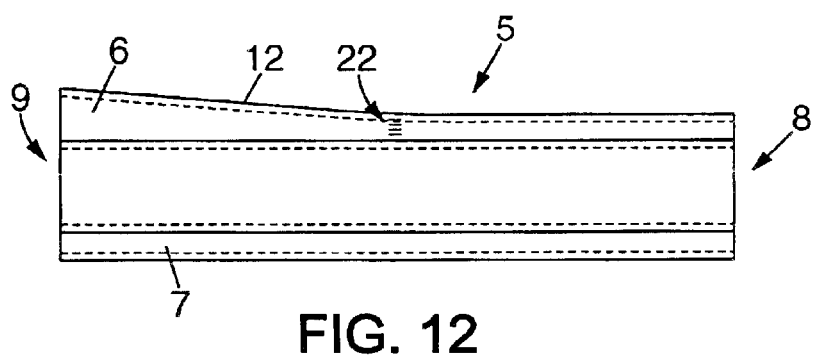
FIG. 12 is a diagrammatic side elevation view of the track assembly of FIG. 11.

In a fifth embodiment, shown in FIGS. 11 and 12, the track assembly 5 differs from the above-described track assembly s essentially by the fact that the male track 6 is not provided with an anchor plate 18. It is shaped from a single metal sheet, as described in Document FR-A-2 767 096. In this embodiment, a flexible blade (not shown) is used, for example, for fixing accessories such as a control bar to the male track 6. The web 12 has a slope such as the slope described with reference to the second embodiment. Naturally, the essential characteristic of this embodiment may be transposed to all of the other embodiments of the invention that are described in the present document.

Figure 13:
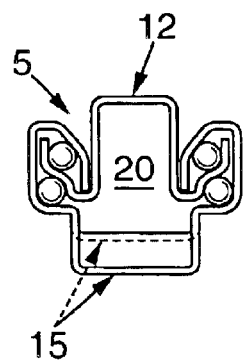
FIG. 13 is a diagrammatic view analogous to the view of FIGS. 3, 5, 7, 9, and 11, showing another embodiment of a track assembly of the present invention.
Figure 14:
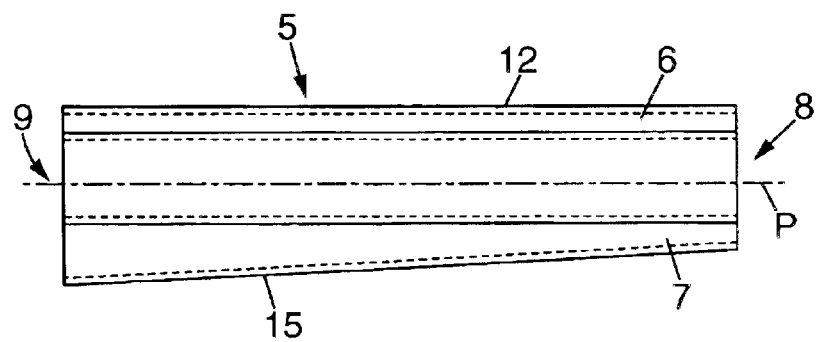
FIG. 14 is a diagrammatic side elevation view of the track assembly of FIG. 13.

In a sixth embodiment, shown in FIGS. 13 and 14, the track assembly 5 differs from the above-described track assemblies essentially by the fact that it is the web 15 of the female track 7 that extends away from the slide plane P at a constant slope from the rear end 8 to the front end 9, while the web 12 of the male track 6 remains parallel to the slide plane P.

The variations in the cross-section of the internal space 20 make it possible in particular to solve compactness problems without (or without significantly) increasing the weight of the track assembly 5. In most cases, the male and female track s 6, 7 have developed dimensions that are substantially identical to those of the tracks of prior art track assemblies.

In addition, in particular when the internal space 20 is to receive both a branch of a control bar and a fixing bolt, it is possible to omit the front bridge generally used to prevent the control bar from interfering with the bolts for fixing to the floor, while the tracks are sliding relative to each other. This makes it possible to ruggedize the structure of the control bar.

Naturally, the invention can be implemented regardless of the positions of the rows of balls 16, 17 and of the slide paths C. Also naturally, the roles of the male track 6 and of the female track 7, in terms of which one is fixed to the seat proper and which one is fixed to the floor, can be interchanged.

What is claimed is:

1. A track assembly for a motor vehicle seat, the track assembly comprising a male track and a female track extending between a rear end and a front end along a longitudinal axis and sliding relative to each other along the longitudinal axis, over a rectilinear path in a slide plane, the male track and the female track each being generally U-shaped as a channel-section, this channel section being formed of:

two vertical flanges; and a web interconnecting the two vertical flanges, the male track and the female track thus defining an internal space extending longitudinally between the flanges of the male track and the two webs;

wherein the cross-section of the internal space, perpendicular to the longitudinal axis, varies along said longitudinal axis.

2. A track assembly according to claim 1, in which one of the tracks, namely either the male track or the female track, is adapted to be fixed to a vehicle seat and the web of said track extends away from the slide plane so as to increase the cross-section of the internal space going towards the front end.

3. A track assembly according to claim 2, in which the web of the track that is adapted to be fixed to a vehicle seat extends progressively away from the slide plane, starting from a central zone substantially half-way between the front end and the rear end, going towards the front end, in order to increase the cross-section of the internal space going towards the front end.

4. A track assembly according to claim 3, in which an anchor plate for fixing a vehicle seat to the track that is adapted to be fixed to a vehicle seat extends substantially from the web of said track away from the slide plane, said anchor plate having a stressed zone that is stressed by a forming operation, and that is situated substantially in the central zone.

5. A track assembly according to claim 2, in which the web of the track adapted to be fixed to a vehicle seat extends away from the slide plane so as to increase the cross-section of the internal space going towards the front end and going towards the rear end, while the cross-section of the internal space is at a minimum in a central zone situated substantially half-way between the front end and the rear end.

6. A track assembly according to claim 1, in which one of the tracks, namely either the male track or the female track is adapted to be fixed to a vehicle seat, and, in a central zone situated substantially half-way between the front end and the rear end, the web of said track extends away from the slide plane so as to increase the cross-section of the internal space in said central zone, the web of the male track being closer to the slide plane in the vicinities of the front and rear ends.

7. A track assembly according to claim 1, in which one of the tracks, namely either the male track or the female track is adapted to be fixed to a vehicle floor, and the web of said track extends away from the slide plane so as to increase the cross-section of the internal space going towards at least one of the ends, namely the front end and/or the rear end.

8. A track assembly according to claim 1, in which one of the tracks, namely either the male track or the female track is adapted to be fixed to the vehicle floor and the web of said track extends away from the slide plane so as to increase the cross-section of the internal space in a central zone situated substantially half-way between the front end and the rear end.

9. A track assembly according to claim 2, in which the male track is adapted to be fixed to the seat, and the female track is adapted to be fixed to the floor of a vehicle.

10. A motor vehicle seat to which a track assembly according to claim 1 is fixed via the male track or via the female track.

* * * * *